US011242416B2

(12) United States Patent
McDaniel et al.

(10) Patent No.: US 11,242,416 B2
(45) Date of Patent: Feb. 8, 2022

(54) AMINO ACID CHELATES OF TITANIUM AND USE THEREOF IN AQUEOUS TITANATION OF POLYMERIZATION CATALYSTS

(71) Applicant: Chevron Phillips Chemical Company LP, The Woodlands, TX (US)

(72) Inventors: Max P. McDaniel, Bartlesville, OK (US); Kathy S. Clear, Bartlesville, OK (US); William C. Ellis, Bartlesville, OK (US); Deloris R. Gagan, Ramona, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 16/439,067

(22) Filed: Jun. 12, 2019

(65) Prior Publication Data

US 2020/0392261 A1    Dec. 17, 2020

(51) Int. Cl.
*B01J 23/86* (2006.01)
*C08F 4/76* (2006.01)
*C08F 4/02* (2006.01)
*C08F 4/78* (2006.01)

(52) U.S. Cl.
CPC ............... *C08F 4/76* (2013.01); *C08F 4/02* (2013.01); *C08F 4/78* (2013.01)

(58) Field of Classification Search
CPC ........ C08F 2500/12; C08F 4/22; C08F 4/025; C08F 4/24; C08F 4/16; C08F 210/16; C08F 210/14; C08F 10/00; C08F 10/02; B01J 2531/62; B01J 2531/46; B01J 2531/122; B01J 31/223; B01J 31/2239; B01J 31/2234; B01J 31/0209; B01J 31/34; B01J 31/0237; B01J 31/0247; B01J 31/0249; B01J 23/86; B01J 23/26
See application file for complete search history.

(56) References Cited

U.S. PATENT DOCUMENTS

| | | | |
|---|---|---|---|
| 3,248,179 A | 4/1966 | Norwood | |
| 4,169,926 A | 10/1979 | McDaniel | |
| 4,296,001 A | 10/1981 | Hawley | |
| 4,339,557 A * | 7/1982 | Hasuo | C08F 297/083 525/247 |
| 4,368,303 A | 1/1983 | McDaniel | |
| 4,424,320 A * | 1/1984 | McDaniel | B01J 21/08 502/236 |
| 4,501,885 A | 2/1985 | Sherk et al. | |
| 4,588,790 A | 5/1986 | Jenkins, III | |
| 5,308,820 A | 5/1994 | Mori et al. | |
| 5,352,749 A | 10/1994 | DeChellis et al. | |
| 5,436,304 A | 7/1995 | Griffin et al. | |
| 5,455,314 A | 10/1995 | Burns et al. | |
| 5,565,175 A | 10/1996 | Hottovy et al. | |
| 5,575,979 A | 11/1996 | Hanson | |
| 6,239,235 B1 | 5/2001 | Hottovy et al. | |
| 6,262,191 B1 | 7/2001 | Hottovy et al. | |
| 6,833,415 B2 | 12/2004 | Kendrick et al. | |
| 7,700,516 B2 | 4/2010 | McDaniel et al. | |
| 9,587,048 B2 | 3/2017 | Paetorius et al. | |
| 9,988,468 B2 | 6/2018 | McDaniel et al. | |
| 2018/0305473 A1 * | 10/2018 | Schwerdtfeger | C08F 4/025 |
| 2019/0097216 A1 | 3/2019 | Aiki et al. | |
| 2019/0153132 A1 * | 5/2019 | McDaniel | B01J 37/0203 |
| 2019/0153133 A1 * | 5/2019 | McDaniel | B01J 23/26 |
| 2019/0314797 A1 * | 10/2019 | McDaniel | B01J 35/1023 |

FOREIGN PATENT DOCUMENTS

EP    2606962 A1 *  6/2013

OTHER PUBLICATIONS

Kim et al (NPL: "Surface tratement of silica nanoparticles for stable and charge-controlled colloidal silica", Int J Nanomedicine, 2014 (suppl 2) pp. 29-40 (Year: 2014).*
Goncalves et al (NPL: Adsorption of hydrogen peroxide on the surface of silica-titania mixed oxide obtained by sol-gel processing method Ecletica, vol. 32, 2007 pp. 41-45 (Year: 2007).*
U.S. Appl. No. 14/858,512, filed Sep. 18, 2015, U.S. Pat. No. 10,213,766, Feb. 26, 2019.
U.S. Appl. No. 16/237,011, filed Dec. 31, 2018.
U.S. Appl. No. 15/495,116, filed Apr. 24, 2017, U.S. Pat. No. 10,287,369, May 14, 2019.
U.S. Appl. No. 15/816,131, filed Nov. 17, 2017, U.S. Pat. No. 10,323,109, Jun. 18, 2019.
U.S. Appl. No. 16/387,199, filed Apr. 17, 2019.
U.S. Appl. No. 15/816,145, filed Nov. 17, 2017.
U.S. Appl. No. 15/953,927, filed Apr. 16, 2018.
U.S. Appl. No. 15/953,930, filed Apr. 16, 2018.
Office Action dated Aug. 14, 2020 (17 pages), U.S. Appl. No. 16/861,705, filed Apr. 29, 2020.

* cited by examiner

*Primary Examiner* — Smita S Patel
(74) *Attorney, Agent, or Firm* — Conley Rose, P.C.

(57) ABSTRACT

A method comprising contacting a silica support with a titanium-containing solution to form a titanated silica support, wherein the titanium-containing solution comprises a titanium compound, a solvent, and an amino acid. The method further comprising drying the titanated silica support to form a pre-catalyst composition; contacting a chromium-containing compound with the silica support, the titanated silica support, the pre-catalyst composition, or combinations thereof; and calcining the pre-catalyst composition to form an olefin polymerization catalyst.

17 Claims, No Drawings

AMINO ACID CHELATES OF TITANIUM AND USE THEREOF IN AQUEOUS TITANATION OF POLYMERIZATION CATALYSTS

TECHNICAL FIELD

The present disclosure relates to catalyst compositions. More specifically, the present disclosure relates to methods of preparing olefin polymerization catalyst compositions and polymers prepared from same.

BACKGROUND

An economically important class of olefin polymerization catalysts includes chromium-silica-titanium (Cr/Si—Ti) catalysts prepared from silica-based catalyst supports. Rigorous drying of the water-sensitive catalyst components used to produce Cr/Si—Ti catalysts increases the time and cost of production. Development of an aqueous solution suitable for depositing titanium onto a silica-based catalyst support would reduce the costs of production of olefin polymerization catalysts. Thus, there is an ongoing need to develop new methods of producing olefin polymerization catalysts.

SUMMARY

Disclosed herein is a method comprising contacting a silica support with a titanium-containing solution to form a titanated silica support, wherein the titanium-containing solution comprises a titanium compound, a solvent, and an amino acid.

While the subject matter disclosed herein is susceptible to various modifications and alternative forms, only a few specific aspects have been shown by way of example and are described below in detail. The detailed descriptions of these specific aspects are not intended to limit the breadth or scope of the subject matter disclosed or the appended claims in any manner. Rather, the detailed written descriptions are provided to illustrate the present disclosure to a person skilled in the art and to enable such person to make and use the concepts disclosed herein.

DETAILED DESCRIPTION

The present disclosure encompasses olefin polymerization catalysts and pre-catalyst compositions thereof, methods of preparing olefin polymerization catalysts and pre-catalyst compositions thereof, and methods of utilizing olefin polymerization catalysts. In an aspect, a method of the present disclosure comprises contacting a silica support or a chromium-silica support (i.e., support) with titanium to produce a Cr/Si—Ti catalyst. The methodologies disclosed herein contemplate the use of a titanium-containing solution (e.g., an aqueous titanium solution (ATS)) to facilitate the association of titanium with the support (e.g., in the presence of water). In an aspect, a methodology for preparation of the olefin polymerization catalyst comprises contacting a chromium-silica support with the titanium-containing solution (e.g., ATS) under conditions suitable to form a pre-catalyst composition and further processing the pre-catalyst composition to produce a Cr/Si—Ti catalyst. In an alternative aspect, a methodology for preparation of the olefin polymerization catalyst comprises contacting (e.g., simultaneously or sequentially) a silica support with the titanium-containing solution and a chromium-containing compound (e.g., an ATS further comprising a chromium-containing compound) under conditions suitable to form a pre-catalyst composition and further processing the pre-catalyst composition to produce a Cr/Si—Ti catalyst. While these aspects may be disclosed under a particular heading, the heading does not limit the disclosure found therein. Additionally, the various aspects disclosed herein can be combined in any manner.

Aspects of the present disclosure are directed to catalyst compositions and pre-catalyst compositions. In an aspect, a catalyst composition comprises an olefin polymerization catalyst (e.g., a Cr/Si—Ti catalyst). In a further aspect, the olefin polymerization catalyst comprises a treated pre-catalyst composition. In yet a further aspect, the treated pre-catalyst composition comprises a pre-catalyst composition that has been subjected to an activation treatment (e.g., calcination, optionally subsequent to drying) as disclosed herein.

Disclosed herein are methods of making pre-catalyst compositions and pre-catalyst compositions made thereby. In an aspect, a method of making a pre-catalyst composition comprises contacting a silica support with a titanium-containing solution to form a titanated silica support, wherein the titanium-containing solution is formed by contacting (in any order) a solvent (e.g., water); an amino acid; optionally a peroxide; optionally a carboxylate; and a titanium-containing compound (also referred to herein as a "titanium compound"). The method may further comprise contacting a chromium-containing compound with the silica support or the titanated silica support, and the support may be dried before and/or after contact with the chromium-containing compound. In an aspect, the titanium-containing solution further comprises the chromium-containing compound.

In an aspect, a method of making a pre-catalyst composition comprises contacting a chromium-silica support with aqueous titanium solution to form a titanated/chrominated silica support, wherein the titanium-containing solution is formed by contacting (in any order) water; an amino acid; optionally a peroxide; optionally a carboxylate; and a titanium-containing compound.

In an aspect, a method of making a pre-catalyst composition comprises contacting a chromium-silica support with aqueous titanium solution to form a titanated/chrominated silica support, wherein the titanium-containing solution is formed by contacting (in any order) water; an amino acid, a peroxide; and a titanium-containing compound.

In an aspect, a method of making a pre-catalyst composition comprises contacting a chromium-silica support with aqueous titanium solution to form a titanated/chrominated silica support, wherein the titanium-containing solution is formed by contacting (in any order) water; an amino acid, a carboxylate; and a titanium-containing compound.

In an aspect, a method of making a pre-catalyst composition comprises dissolving a titanium-containing compound (e.g., a titanium alkoxide) in an aqueous solution (e.g., water) comprising an amino acid and optionally a peroxide or a carboxylate to form an aqueous titanium solution (ATS); contacting a silica support with the aqueous titanium solution to form a titanated support; and drying the titanated support to form a dried titanated support; wherein chromium is added by contacting the silica support, the titanated support, the dried titanated support, or a combination thereof with a chromium-containing compound (also referred to herein as a "chromium compound") to form the pre-catalyst composition.

A method of forming a pre-catalyst composition or catalyst of this disclosure comprises forming a titanium-containing solution (e.g., an aqueous titanium solution (ATS))

by contacting a solvent; an amino acid; optionally a peroxide; optionally a carboxylate; and a titanium compound. The titanium-containing solution (e.g., ATS) can be formed by combining the solvent; the amino acid; optionally a peroxide; optionally a carboxylate; and the titanium compound in any suitable order. In a particular aspect, an ATS of the present disclosure is formed by contacting water, an amino acid, optionally a peroxide, optionally a carboxylate, and a titanium-containing compound (e.g., titanium alkoxide). In aspects, the titanium-containing solution comprises, consists essentially of, or consists of a combination of the solvent; the amino acid; optionally a peroxide; optionally a carboxylate; and the titanium compound. In aspects, the aqueous titanium solution (ATS) comprises, consists essentially of, or consists of a combination of water; the amino acid; optionally a peroxide; optionally a carboxylate; and the titanium compound. In aspects, the aqueous titanium solution (ATS) comprises, consists essentially of, or consists of a combination of water; the amino acid; a peroxide; and the titanium compound. In aspects, the aqueous titanium solution (ATS) comprises, consists essentially of, or consists of a combination of water; the amino acid; a carboxylate; and the titanium compound.

In an aspect, the titanium-containing solution of the present disclosure comprises a solvent. The solvent may be an aqueous solvent, an alcohol, a ketone, or a combination thereof. In an aspect, the solvent comprises water and the resultant solution is an aqueous titanium solution (ATS). A non-limiting example of an aqueous solvent suitable for use in the present disclosure comprises deionized water, distilled water, filtered water, or a combination thereof. Non-limiting examples of alcohols suitable for use as the solvent include methanol, ethanol, n-propanol, isopropanol, n-butanol, isobutanol, pentanol, hexanol, cyclohexanol, heptanol, octanol, benzyl alcohol, phenol, or a combination thereof. Examples of ketones include acetone, 2-pentanone, 3-hexanone, and the like.

In a particular aspect, the titanium-containing solution (e.g., ATS) as disclosed herein comprises an amino acid. In an aspect, the amino acid comprises an alpha ($\alpha$) amino acid, a beta ($\beta$) amino acid, or a combination thereof, wherein an $\alpha$ amino acid is an amino acid having an amino group and a carboxyl group attached to the alpha carbon, and wherein a $\beta$ amino acid is an amino acid in which the amino group is attached to the secondary carbon. In aspects, the amino acid comprises an "essential" amino acid meaning an amino acid that cannot be made by the human body but must be supplied by food. In an aspect, the essential amino acid comprises histidine, isoleucine, leucine, lysine, methionine, phenylalanine, threonine, tryptophan, valine, or a combination thereof. In aspects, the amino acid comprises a $\gamma$ hydroxyl ($OH^-$) group. In an aspect, the amino acid comprises glycine, dimethylglycine, threonine, serine, aspartic acid, arginine, or a combination thereof. In an aspect, the amino acid comprises dimethylglycine, threonine, or a combination thereof.

In an aspect, a titanium-containing solution (e.g., ATS) of the present disclosure comprises an amino acid solution having a weight ratio of solvent to amino acid in a range of from about 1 to about 1000; alternatively, from about 5 to about 500; or alternatively, from about 10 to about 100. In a further aspect, the ATS comprises a molar ratio of amino acid to titanium in a range of from about 0.1 to about 10; alternatively, from about 0.5 to about 5; or alternatively, from about 1 to about 3. In some aspects, the equivalent molar ratio of amino acid to the titanium-containing compound may be in a range of from about 2 to about 3. Also, it is expected that the molar ratio of the components (e.g., amino acid, optional peroxide, optional carboxylate, and titanium) present in the titanium-containing solution (e.g., ATS) will likewise be present upon impregnation of the silica support and drying thereof to form a pre-catalyst.

In some embodiments, the titanium-containing solution (e.g., aqueous titanium solution (ATS)) of this disclosure comprises a peroxide. In aspects, the peroxide comprises hydrogen peroxide ($H_2O_2$), dicumyl peroxide, benzoyl peroxide, di-t-butyl peroxide, t-butyl hydroperoxide, a percarboxylic acid, a peroxy acid, a perester, and the like, or a combination thereof. Although a variety of peroxides, including organic peroxides, can be utilized, in aspects, the peroxide comprises hydrogen peroxide ($H_2O_2$). The use of hydrogen peroxide can minimize HRVOC emissions during calcining of the pre-catalyst composition to produce the catalyst.

Nonlimiting examples of organic peroxides suitable for use in this disclosure include dialkyl peroxides, dicumyl peroxide, di-t-butyl peroxide, 2,5-dimethyl-2,5-di-(t-butylperoxy) hexane (DHBP), diacyl peroxides, dilauroyl peroxide, dibenzoyl peroxide, peroxyesters, t-butyl peroxy-2-ethylhexanoate, OO-(t-butyl)-O-(2-ethylhexyl) peroxycarbonate, t-butyl peroxy-3,5,5-trimethylhexyl-hexanoate, t-butyl peroxy benzoate, diperoxyketals, diacyl peroxides, t-amyl peroxides, n-butyl-4,4-di-(t-butyl peroxy) valerate, and the like, or combinations thereof.

In an aspect of the titanium-containing solution, the amino acid is threonine and the peroxide is hydrogen peroxide.

When used as described herein, the peroxide can be present in the titanium-containing solution (e.g., ATS) in an amount of about 1 to about 100 mol of peroxide per mol of Ti present, alternatively, in an amount of about 1 to about 50 mol of peroxide per mol of Ti present; alternatively in an amount of about 1 to about 10 mol of peroxide per mol of Ti present; or alternatively in an amount of about 3 to about 10 mol of peroxide per mol of Ti present. In aspects, the titanium-containing solution (e.g., ATS) can contain from about 1% to about 25, from about 5 to about 20, or from about 8 to about 15 weight percent (wt %) hydrogen peroxide, based on a total weight of the aqueous titanium solution.

In some embodiments, the titanium-containing solution (e.g., aqueous titanium solution (ATS)) of this disclosure comprises a carboxylate. In aspects, the carboxylate is provided via addition of a carboxylic acid to the titanium-containing solution. The carboxylic acid can comprise a monocarboxylic acid, a dicarboxylic acid, a tricarboxylic acid, an $\alpha$-hydroxycarboxylic acid, a $\beta$-hydroxycarboxylic acid, an $\alpha$-ketocarboxylic acid, or a combination thereof. In an aspect, the carboxylic acid may be a $C_1$ to $C_{15}$ monocarboxylic acid or a $C_1$ to $C_5$ monocarboxylic acid; alternatively, a $C_1$ to $C_{15}$ dicarboxylic acid or a $C_1$ to $C_5$ dicarboxylic acid; alternatively, a $C_1$ to $C_{15}$ tricarboxylic acid or a $C_1$ to $C_5$ tricarboxylic acid; alternatively, a $C_1$ to $C_{15}$ $\alpha$-hydroxycarboxylic acid or a $C_1$ to $C_5$ $\alpha$-hydroxycarboxylic acid; alternatively, a $C_1$ to $C_{15}$ $\beta$-hydroxycarboxylic acid or a $C_1$ to $C_5$ $\beta$-hydroxycarboxylic acid; or alternatively, a $C_1$ to $C_{15}$ $\alpha$-ketocarboxylic acid or a $C_1$ to $C_5$ $\alpha$-ketocarboxylic acid; or alternatively any combination thereof. In aspects, the carboxylic acid may be a multi-carboxylic acid. As utilized herein, multi-carboxylic includes carboxylic acids comprising two or more carboxylic acid groups.

In an aspect, the titanium-containing solution comprises a carboxylic acid selected from the group consisting of acetic acid, formic acid, citric acid, gluconic acid, glycolic acid, glyoxylic acid, lactic acid, malic acid, malonic acid, oxalic acid, propionic acid, phosphonoacetic acid, tartaric acid, and combinations thereof. In yet a further aspect, the titanium-containing solution comprises oxalic acid.

In an aspect of the titanium-containing solution, the amino acid is glycine, dimethylglycine, arginine, aspartic acid, or serine, and the carboxylate is provided by a carboxylic acid. In an aspect of the titanium-containing solution, the amino acid is glycine, dimethylglycine, arginine, aspartic acid, or serine, and the carboxylate is provided by a carboxylic acid selected from the group consisting of acetic acid, formic acid, citric acid, gluconic acid, glycolic acid, glyoxylic acid, lactic acid, malic acid, malonic acid, oxalic acid, propionic acid, phosphonoacetic acid, tartaric acid, and combinations thereof. In an aspect of the titanium-containing solution, the amino acid is glycine, dimethylglycine, arginine, aspartic acid, or serine, and the carboxylate is provided by oxalic acid.

When used as described herein, the carboxylate can be present in the titanium-containing solution (e.g., ATS) in an amount of about 0.5 to about 10 mol of carboxylate per mol of Ti present, alternatively, in an amount of about 1 to about 5 mol of carboxylate per mol of Ti present; alternatively in an amount of about 1.5 to about 4 mol of carboxylate per mol of Ti present; or alternatively in an amount of about 1 to about 2.5 mol of carboxylate per mol of Ti present.

The source of titanium to be incorporated into the titanium-containing solution (e.g., an ATS) may be any titanium compound capable of providing a sufficient amount of titanium to the olefin polymerization catalyst and the pre-catalyst composition thereof. In a further aspect, the titanium-containing compound comprises a tetravalent titanium (Ti(IV)) compound or a trivalent titanium (Ti(III)) compound. The Ti(IV) compound may be any compound that comprises Ti(IV); alternatively, the Ti(IV) compound may be any compound that is able to release a Ti(IV) species upon dissolving into the solvent to form the titanium-containing solution (e.g., ATS). The Ti(III) compound may be any compound that comprises Ti(III); alternatively, the Ti(III) compound may be any compound that is able to release a Ti(III) species upon dissolving into the solvent to form the titanium-containing solution (e.g., ATS). In an aspect the titanium compound is a Ti(IV) compound that hydrolyzes upon contact with an aqueous solution to yield hydrated titania (e.g., as freshly precipitated titania in the aqueous solution that can be further dissolved by inclusion of an amino acid and optionally a carboxylate (e.g., carboxylic acid) in the aqueous solution as shown in the Examples below). In an aspect the titanium compound is a Ti(IV) compound that hydrolyzes upon contact with an aqueous solution to yield hydrated titania is a titanium alkoxide.

In an aspect, the titanium-containing compound suitable for use in the titanium-containing solution (e.g., ATS) of the present disclosure comprises a titanium alkoxide. In aspects, the titanium-containing compound comprises a Ti(IV) compound comprising at least one alkoxide group; or alternatively, at least two alkoxide groups. Ti(IV) compounds suitable for use in the present disclosure include, but are not limited to, Ti(IV) compounds that have the general formula Ti(OR)$_4$, TiO(OR)$_2$, Ti(OR)$_2$(acac)$_2$, Ti(OR)$_2$(oxal), or a combination thereof, wherein each R is independently ethyl, isopropyl, n-propyl, isobutyl, or n-butyl; "acac" is acetylacetonate; and "oxal" is oxalate. Alternatively, the titanium-containing compound comprises a titanium(IV) alkoxide. In an aspect, the titanium(IV) alkoxide can be titanium(IV) ethoxide, titanium(IV) isopropoxide, titanium(IV) n-propoxide, titanium(IV) n-butoxide, titanium(IV) 2-ethylhexoxide, or a combination thereof. In a particular aspect, the titanium-containing compound can be titanium(IV) isopropoxide.

In an aspect, the titanium-containing compound suitable for use in the titanium-containing solution (e.g., ATS) of the present disclosure comprises a Ti salt such as oxylate, lactate, citrate, glycolate, tartrate, etc.

In a still further aspect, the titanium-containing compound suitable for use in the present disclosure can comprise hydrous titania, titanium hydroxide, titanium dioxide, titanic acid, titanyl sulfate, titanium acetylacetonate, titanium oxyacetylacetonate, or a combination thereof.

In yet another aspect, the titanium-containing compound suitable for use in the present disclosure can comprise a titanium(IV) halide, non-limiting examples of which include titanium tetrachloride, titanium tetrabromide, titanium(IV) oxychloride, and titanium(IV) oxybromide. In a further aspect the titanium(IV) halide can comprise a titanium alkoxyhalide having the general formula Ti(OR)$_n$Q$_{4-n}$; wherein each R independently is ethyl, isopropyl, n-propyl, isobutyl, or n-butyl; wherein Q may be a fluoride, a chloride, a bromide, an iodide, or a combination thereof and wherein n may be an integer from 1 to 4.

In aspects, the titanium compound can be formed in situ in the aqueous titanium solution. For example, in aspects, forming an aqueous titanium solution comprising a titanium compound having the formula Ti(acac)$_2$(OR)$_2$ comprises in situ formation of the titanium compound having the formula Ti(acac)$_2$(OR)$_2$ by the combination of acetylacetone (acac) and a titanium precursor having the formula Ti(OR)$_4$ during formation of the aqueous titanium solution.

In an aspect, the titanium compound has the formula Ti(OR)$_4$, TiO(OR)$_2$, Ti(OR)$_2$(acac)$_2$, or Ti(OR)$_2$(oxal), wherein "acac" is acetylacetonate, "oxal" is oxalate, and each R independently is ethyl, isopropyl, n-propyl, isobutyl, or n-butyl. In an aspect, the titanium compound is a titanium (IV) compound selected from the group consisting of Ti(OH)$_4$, TiO(OH)$_2$, TiO$_2$, TiO(oxalate)$_2$, and combinations thereof, or a titanium (III) compound selected from the group consisting of Ti$_2$(SO$_4$)$_3$, Ti(OAc)$_3$, Ti(oxalate)$_3$, Ti(NO$_3$)$_3$, and combinations thereof.

An amount of titanium present in an olefin polymerization catalyst of the present disclosure may range from about 0.01 wt. % to about 10 wt. %; alternatively, from about 0.5 wt. % to about 5 wt. %; alternatively, from about 1 wt. % to about 4 wt. %; or alternatively, from about 2 wt. % to about 4 wt. % titanium based upon the total weight of the olefin polymerization catalyst. In another aspect, the amount of titanium present in the olefin polymerization catalyst may range from about 1 wt. % to about 5 wt. % titanium based upon the total weight of the olefin polymerization catalyst. Herein, a titanium percentage refers to a weight percent (wt. %) of titanium associated with the olefin polymerization catalyst based upon the total weight of the olefin polymerization catalyst after completion of all processing steps (i.e., after activation via calcination). In a further aspect, an amount of titanium present in a pre-catalyst composition of the present disclosure may range from about 0.01 wt. % to about 25 wt. %; alternatively, from about 0.1 wt. % to about 20 wt. %; alternatively, from about 0.5 wt. % to about 10 wt. %; alternatively, from about 1 wt. % to about 6 wt. %; or alternatively, from about 2 wt. % to about 4 wt. % titanium based upon a total weight of silica within the pre-catalyst. Herein, a titanium percentage refers to a weight percent (wt. %) of titanium associated with the pre-catalyst composition based upon a total weight of silica within the pre-catalyst composition after completion of all processing steps excluding activation via calcination.

The components of the titanium-containing solution (e.g., ATS) can be combined in any suitable order known to those of skill in the art and with the help of this disclosure. For example, in an aspect, an ATS is prepared by sequential addition of a titanium-containing compound as disclosed herein to the amino acid or aqueous amino acid mixture, which may optionally also comprise a peroxide or a carboxylate. In an alternative aspect, the titanium-containing compound and the amino acid may be contacted and subsequently contacted with the solvent (e.g., water) to form the titanium-containing solution (e.g., ATS) as disclosed herein. In a further aspect, the titanium compound can be dissolved in the amino acid and solvent (e.g., water) and optionally peroxide added thereto. In a further aspect, the titanium compound can be dissolved in the carboxylate (e.g., carboxylic acid) and the amino acid and solvent (e.g., water) added thereto.

In a particular aspect, the aqueous titanium solution (ATS) suitable for use in the present disclosure may be characterized by a pH of less than about 5.5. Alternatively, the ATS may be characterized by a pH in a range of from about 2.5 to about 5.5; alternatively, from about 3.0 to about 5.0; or alternatively, from about 3.5 to about 4.5.

In an aspect of the present disclosure, a method for preparation of an olefin polymerization catalyst or pre-catalyst composition comprises contacting a silica support or a chromium-silica support with the titanium-containing solution (e.g., an ATS) to form a titanated support or a titanated/chrominated support.

A catalyst (e.g., a Cr/Si—Ti olefin polymerization catalyst) and a pre-catalyst composition thereof of the present disclosure comprise a support material that comprises silica (i.e., silicon dioxide, $SiO_2$), which is referred to herein a silica support. The silica support provides a solid substrate that provides physical/structural support for the catalytic metals (e.g., Cr and Ti) of the pre-catalyst composition and the resultant catalyst (e.g., olefin polymerization catalyst). The silica support may be any silica support suitable for preparation of the olefin polymerization catalyst and the pre-catalyst composition thereof as disclosed herein. The silica support may be a naturally occurring material comprising silica or a synthetic material comprising silica. The silica support may be prepared using any suitable method, e.g., the silica support may be prepared by hydrolyzing tetrachlorosilane ($SiCl_4$) with water or by contacting sodium silicate and a mineral acid. In a particular aspect, the silica support may be a produced by a gel manufacturing process (e.g., a sol-gel process), which may provide a hydrogel silica support or a xerogel silica support. Silica supports produced via gel manufacturing processes can be dried prior to contact with any other catalyst components (e.g., drying a hydrogel to form a xerogel).

The silica support suitable for use in the present disclosure may contain greater than about 50 wt. % silica; alternatively, greater than about 80 wt. % silica; or alternatively, greater than about 95 wt. % silica based upon the total weight of the silica support. In an aspect, the silica support comprises an amount of silica in a range of from about 70 wt. % to about 95 wt. % based upon a total weight of the silica support.

The silica support may include additional components that do not adversely affect the catalyst, such as zirconia, alumina, thoria, magnesia, fluoride, sulfate, phosphate, or a combination thereof. In a particular aspect, the silica support of the present disclosure comprises alumina, and may be referred to as a silica-alumina support (i.e., a $SiO_2/Al_2O_3$ support).

Non-limiting examples of silica supports suitable for use in this disclosure include ES70, which is a silica support material with a surface area of 300 $m^2$/gram and a pore volume of 1.6 $cm^3$/gram, that is commercially available from PQ Corporation; V398400, which is a silica support material that is commercially available from Evonik; and the SYLOPOL® family of silica supports commercially available from W. R. Grace & Co.

The silica support suitable for use in the present disclosure may have a surface area and a pore volume effective to provide for the production of an active olefin polymerization catalyst. In an aspect of the present disclosure, the silica support possesses a surface area in a range of from about 100 $m^2$/gram to about 1000 $m^2$/gram; alternatively, from about 250 $m^2$/gram to about 1000 $m^2$/gram; alternatively, from about 250 $m^2$/gram to about 700 $m^2$/gram; alternatively, from about 250 $m^2$/gram to about 600 $m^2$/gram; or alternatively, greater than about 250 $m^2$/gram. The silica support may be porous and further characterized by a pore volume of greater than about 0.9 $cm^3$/gram; alternatively, greater than about 1.0 $cm^3$/gram; or alternatively, greater than about 1.5 $cm^3$/gram. In an aspect of the present disclosure, the silica support is characterized by a pore volume in a range of from about 1.0 $cm^3$/gram to about 2.5 $cm^3$/gram. The silica support may be further characterized by an average particle size in a range of from about 10 microns to about 500 microns; alternatively, about 25 microns to about 300 microns; or alternatively, about 40 microns to about 150 microns. Generally, an average pore size of the silica support may be in a range of from about 10 Angstroms (Å) to about 1000 Angstroms (Å). In one aspect of the present disclosure, the average pore size of the silica support is in a range of from about 50 Angstroms (Å) to about 500 Angstroms (Å); alternatively, from about 75 Angstroms (Å) to about 350 Angstroms (Å).

The silica support may be present in the olefin polymerization catalyst and a pre-catalyst composition thereof in an amount in a range of from about 50 wt. % to about 99 wt. %; or alternatively, from about 80 wt. % to about 99 wt. %. Herein a silica support percentage refers to a weight percent (wt. %) of the silica support associated with the olefin polymerization catalyst based upon the total weight of the olefin polymerization catalyst after completion of all processing steps (i.e., after activation via calcination). Alternatively, the silica support percentage refers to a weight percent (wt. %) of the silica support associated with the pre-catalyst based upon the total weight of the pre-catalyst after completion of all relevant processing steps excluding activation via calcination.

In an aspect, preparation the catalyst (e.g., a Cr/Si—Ti olefin polymerization catalyst) and the pre-catalyst composition thereof excludes thermal treatment (e.g., drying) of the silica support prior to contact with any other catalyst component (e.g., prior to contact with the titanium-containing solution (e.g., ATS) and/or prior to contact with a chromium-containing compound). In an embodiment where the silica support is a xerogel silica support, the xerogel is not subjected to additional drying after formation of the xerogel (e.g., after formation, a xerogel silica support may absorb some ambient moisture which is not removed by further drying prior to contact with any other catalyst component). Consequently, the silica support suitable for use in the present disclosure may be a termed a hydrated silica support. Without wishing to be limited by theory, the hydrated silica support comprises a silica support wherein water evolution occurs when the silica support is heated within a range of from about 180° C. to about 200° C. under vacuum conditions for a period of time ranging from about 8 hours to about 20 hours. In a further aspect, the silica support may contain from about 0.1 wt. % to about 20 wt. % water; alternatively, about 1 wt. % to about 20 wt. % water; alternatively, about 1 wt. % to about 10 wt. % water; or alternatively, about 0.1 wt. % to about 10 wt. % water based upon the total weight of the silica support.

In alternative aspects, the silica support may be a dried silica support, and the method of making the pre-catalyst composition can further comprise drying a hydrated silica support to provide the dried silica support, and the dried silica support can be subsequently contacted with one or more additional catalyst components (e.g., contacted with the titanium-containing solution (e.g., ATS) and/or contacted with a chromium-containing compound). The silica support can be dried, for example, by heating the silica support to a temperature in a range of from about 150° C. to about 250° C. and maintaining the temperature of the silica support in the range of from about 150° C. to about 250° C. for a time period of from about 1 hour to about 24 hours to form the dried support.

In a particular aspect of the present disclosure, a silica support suitable for use in the present disclosure comprises chromium. The silica support comprising chromium may be termed a chromated silica support or a chromium-silica support (Cr—Si support or Cr-silica support). In another aspect, the chromated support comprises the characteristics disclosed herein for the silica support while additionally containing chromium. A non-limiting example of the chromated silica support is HA30W, which is a chromium-silica support material that is commercially available from W. R. Grace and Company. In other aspects, a method of forming a pre-catalyst composition or catalyst of this disclosure can further comprise contacting the silica support with a chromium-containing compound to form a chromated silica support, and the chromated silica support can be contacted with a titanium-containing solution (e.g., ATS) of the type disclosed herein.

In a still further aspect, an olefin polymerization catalyst and/or a pre-catalyst composition thereof of the present disclosure comprise chromium. In such aspects, chromium can be incorporated into the pre-catalyst composition or the catalyst via the contacting of a silica support, a titanated support, a dried titanated support, or combinations thereof with a chromium-containing compound (also referred to as a chromium compound) to form the pre-catalyst composition, which can be calcined to form the polymerization catalyst. In an aspect, one or more chromium-containing compounds are added to the titanium-containing solution (e.g., ATS), and chromium and titanium are added concurrently to the silica support by contact with the titanium-containing solution (e.g., ATS) that further comprises chromium.

The source of chromium may be any chromium-containing compound capable of providing a sufficient amount of chromium to the olefin polymerization catalyst and the pre-catalyst composition thereof. In an aspect, the chromium-containing compound may be a water-soluble chromium compound or a hydrocarbon-soluble chromium compound. Examples of water-soluble chromium compounds include chromium trioxide, chromium acetate, chromium nitrate, or a combination thereof. Examples of hydrocarbon-soluble chromium compounds include tertiary butyl chromate, biscyclopentadienyl chromium(II), chromium(III) acetylacetonate, or a combination thereof. In one aspect of the present disclosure, the chromium-containing compound may be a chromium(II) compound, a chromium(III) compound, or a combination thereof. Suitable chromium(III) compounds include, but are not limited to, chromium(III) carboxylates, chromium(III) naphthenates, chromium(III) halides, chromium(III) sulfates, chromium(III) nitrates, chromium(III) dionates, or a combination thereof. Specific chromium(III) compounds include, but are not limited to, chromium(III) sulfate, chromium(III) chloride, chromium (III) nitrate, chromium(III) bromide, chromium(III) acetylacetonate, and chromium(III) acetate. Suitable chromium (II) compounds include, but are not limited to, chromium(II) chloride, chromium(II) bromide, chromium(II) iodide, chromium(II) sulfate, chromium(II) acetate, or a combination thereof.

An amount of chromium present in the olefin polymerization catalyst may be in a range of from about 0.01 wt. % to about 10 wt. %; alternatively, from about 0.5 wt. % to about 5 wt. %; alternatively, from about 1 wt. % to about 4 wt. %; or alternatively, from about 2 wt. % to about 4 wt. % chromium based upon the total weight of the olefin polymerization catalyst. In another aspect, the amount of chromium present in the olefin polymerization catalyst may be in a range of from about 1 wt. % to about 5 wt. % chromium based upon the total weight of the olefin polymerization catalyst. Herein, a chromium percentage refers to a weight percent (wt. %) of chromium associated with the olefin polymerization catalyst based upon the total weight of the olefin polymerization catalyst after completion of all processing steps (i.e., after activation via calcination). In a further aspect, an amount of chromium present in a pre-catalyst composition may be in a range of from about 0.01 wt. % to about 10 wt. %; alternatively, from about 0.1 wt. % to about 5 wt. %; alternatively, from about 0.2 wt. % to about 2 wt. %; or alternatively, from about 0.5 wt. % to about 1.5 wt. % chromium based upon a total weight of silica within the pre-catalyst composition. Herein, a chromium percentage refers to a weight percent (wt. %) of chromium associated with the pre-catalyst composition based upon the total weight of silica within the pre-catalyst after completion of all processing steps excluding activation via calcination.

In an aspect of the present disclosure the pre-catalyst or catalyst components disclosed herein may be contacted in any order or fashion deemed suitable to one of ordinary skill in the art with the aid of the present disclosure to produce, respectively, a pre-catalyst composition or an olefin polymerization catalyst having the characteristics disclosed herein.

In a particular aspect, a method of forming a pre-catalyst composition comprises: forming a titanium-containing solution (e.g., ATS) as described herein comprising a solvent (e.g., water), an amino acid, optionally a peroxide, optionally a carboxylate, and a titanium compound as described herein; contacting a chromated silica support with the titanium-containing solution (e.g., ATS) to form a titanated/chromated support; drying the titanated/chromated support to form the pre-catalyst composition. The pre-catalyst composition can be calcined, as detailed further hereinbelow, to provide a polymerization catalyst.

In another particular aspect, a method of forming a pre-catalyst composition comprises: forming a titanium-containing solution (e.g., ATS) as described herein comprising a solvent (e.g., water), an amino acid, optionally a peroxide, optionally a carboxylate, and a titanium compound as described herein; contacting a silica support with the titanium-containing solution (e.g., ATS) to form a titanated support; contacting the titanated support with a chromium-containing compound as described herein to provide a titanated/chrominated support; and drying the titanated/chrominated support to form the pre-catalyst composition. The pre-catalyst composition can be calcined, as detailed further hereinbelow, to provide a polymerization catalyst.

In another particular aspect, a method of forming a pre-catalyst composition comprises: forming a titanium-containing solution (e.g., ATS) as described herein comprising a solvent (e.g., water), an amino acid, optionally a peroxide, optionally a carboxylate, and a titanium compound as described herein; simultaneous or sequentially contacting a silica support with the titanium-containing solution (e.g., ATS) and a chromium-containing compound as described herein to form a titanated/chrominated support; and drying the titanated/chrominated support to form the pre-catalyst composition. The pre-catalyst composition can be calcined, as detailed further hereinbelow, to provide a polymerization catalyst.

In another particular aspect, a method of forming a pre-catalyst composition comprises: forming a titanium-containing solution (e.g., ATS) as described herein comprising a solvent (e.g., water), an amino acid, optionally a peroxide, optionally a carboxylate, a titanium compound as described herein, and a chromium-containing compound as described herein; contacting a silica support with the titanium-containing solution (e.g., ATS) further comprising the chromium-containing compound as described herein to form a titanated/chrominated support; and drying the titanated/chrominated support to form the pre-catalyst composition. The pre-catalyst composition can be calcined, as detailed further hereinbelow, to provide a polymerization catalyst.

In another particular aspect, a method of forming a pre-catalyst composition, the method comprising: forming an aqueous titanium solution as described herein comprising water, an amino acid, optionally a peroxide, optionally a carboxylate, and a titanium compound as described herein; contacting a silica support with the aqueous titanium solution to form a titanated support; drying the titanated support to form a dried titanated support; and contacting the dried titanated support with a chromium-containing compound as described herein for form a titanated/chrominated support and optionally drying the titanated/chrominated support to form the pre-catalyst composition. In such aspects, drying the titanated/chrominated support to form the pre-catalyst composition can be effected by any means known to those of skill in the art and with the help of this disclosure, and can be effected as described hereinbelow. The pre-catalyst composition can be calcined, as detailed further hereinbelow, to provide a polymerization catalyst.

In another particular aspect, a method of forming a pre-catalyst composition, the method comprising: forming an aqueous titanium solution as described herein comprising water, an amino acid, optionally a peroxide, optionally a carboxylate, a titanium compound as described herein, and a chromium-containing compound as described herein; contacting a silica support with the aqueous titanium solution to form a titanated/chrominated support; optionally drying the titanated/chrominated support to form the pre-catalyst composition. In such aspects, drying the titanated/chrominated support to form the pre-catalyst composition can be effected by any means known to those of skill in the art and with the help of this disclosure, and can be effected as described hereinbelow. The pre-catalyst composition can be calcined, as detailed further hereinbelow, to provide a polymerization catalyst.

In a particular aspect, a method of forming a pre-catalyst composition comprises: forming a titanium-containing solution (e.g., ATS) as described herein comprising a solvent (e.g., water), an amino acid, a peroxide, and a titanium compound as described herein; contacting a chrominated silica support with the titanium-containing solution (e.g., ATS) to form a titanated/chrominated support; drying the titanated/chrominated support to form the pre-catalyst composition. The pre-catalyst composition can be calcined, as detailed further hereinbelow, to provide a polymerization catalyst.

In another particular aspect, a method of forming a pre-catalyst composition, the method comprising: forming an aqueous titanium solution as described herein comprising water, an amino acid, a peroxide, and a titanium compound as described herein; contacting a silica support with the aqueous titanium solution to form a titanated support; drying the titanated support to form a dried titanated support; and contacting the dried titanated support with a chromium-containing compound as described herein for form a titanated/chrominated support and optionally drying the titanated/chrominated support to form the pre-catalyst composition. In such aspects, drying the titanated/chrominated support to form the pre-catalyst composition can be effected by any means known to those of skill in the art and with the help of this disclosure, and can be effected as described hereinbelow. The pre-catalyst composition can be calcined, as detailed further hereinbelow, to provide a polymerization catalyst.

In another particular aspect, a method of forming a pre-catalyst composition, the method comprising: forming an aqueous titanium solution as described herein comprising water, an amino acid, a peroxide, a titanium compound as described herein, and a chromium-containing compound as described herein; contacting a silica support with the aqueous titanium solution to form a titanated/chrominated support; optionally drying the titanated/chrominated support to form the pre-catalyst composition. In such aspects, drying the titanated/chrominated support to form the pre-catalyst composition can be effected by any means known to those of skill in the art and with the help of this disclosure, and can be effected as described hereinbelow. The pre-catalyst composition can be calcined, as detailed further hereinbelow, to provide a polymerization catalyst.

In a particular aspect, a method of forming a pre-catalyst composition comprises: forming a titanium-containing solution (e.g., ATS) as described herein comprising a solvent (e.g., water), an amino acid, a carboxylate, and a titanium compound as described herein; contacting a chrominated silica support with the titanium-containing solution (e.g., ATS) to form a titanated/chrominated support; drying the titanated/chrominated support to form the pre-catalyst composition. The pre-catalyst composition can be calcined, as detailed further hereinbelow, to provide a polymerization catalyst.

In another particular aspect, a method of forming a pre-catalyst composition, the method comprising: forming an aqueous titanium solution as described herein comprising water, an amino acid, a carboxylate, and a titanium compound as described herein; contacting a silica support with the aqueous titanium solution to form a titanated support; drying the titanated support to form a dried titanated support; and contacting the dried titanated support with a chromium-containing compound as described herein for form a titanated/chrominated support and optionally drying the titanated/chrominated support to form the pre-catalyst composition. In such aspects, drying the titanated/chrominated support to form the pre-catalyst composition can be effected by any means known to those of skill in the art and with the help of this disclosure, and can be effected as described hereinbelow. The pre-catalyst composition can be calcined, as detailed further hereinbelow, to provide a polymerization catalyst.

In another particular aspect, a method of forming a pre-catalyst composition, the method comprising: forming an aqueous titanium solution as described herein comprising water, an amino acid, a carboxylate, and a titanium compound as described herein, and a chromium-containing compound as described herein; contacting a silica support with the aqueous titanium solution to form a titanated/chrominated support; optionally drying the titanated/chrominated support to form the pre-catalyst composition. In such aspects, drying the titanated/chrominated support to form the pre-catalyst composition can be effected by any means known to those of skill in the art and with the help of this disclosure, and can be effected as described hereinbelow. The pre-catalyst composition can be calcined, as detailed further hereinbelow, to provide a polymerization catalyst.

In a particular aspect, a method of forming a pre-catalyst composition comprises: forming a titanium-containing solution (e.g., ATS) as described herein comprising a solvent (e.g., water), an amino acid, a peroxide, a carboxylate, and a titanium compound as described herein; contacting a chrominated silica support with the titanium-containing solution (e.g., ATS) to form a titanated/chrominated support; drying the titanated/chrominated support to form the pre-catalyst composition. The pre-catalyst composition can be calcined, as detailed further hereinbelow, to provide a polymerization catalyst.

In another particular aspect, a method of forming a pre-catalyst composition, the method comprising: forming an aqueous titanium solution as described herein comprising water, an amino acid, a peroxide, a carboxylate, and a titanium compound as described herein; contacting a silica support with the aqueous titanium solution to form a titanated support; drying the titanated support to form a dried titanated support; and contacting the dried titanated support with a chromium-containing compound as described herein for form a titanated/chrominated support and optionally drying the titanated/chrominated support to form the pre-catalyst composition. In such aspects, drying the titanated/chrominated support to form the pre-catalyst composition can be effected by any means known to those of skill in the art and with the help of this disclosure, and can be effected as described hereinbelow. The pre-catalyst composition can be calcined, as detailed further hereinbelow, to provide a polymerization catalyst.

In another particular aspect, a method of forming a pre-catalyst composition, the method comprising: forming an aqueous titanium solution as described herein comprising water, an amino acid, a peroxide, a carboxylate, and a titanium compound as described herein, and a chromium-containing compound as described herein; contacting a silica support with the aqueous titanium solution to form a titanated/chrominated support; optionally drying the titanated/chrominated support to form the pre-catalyst composition. In such aspects, drying the titanated/chrominated support to form the pre-catalyst composition can be effected by any means known to those of skill in the art and with the help of this disclosure, and can be effected as described hereinbelow. The pre-catalyst composition can be calcined, as detailed further hereinbelow, to provide a polymerization catalyst.

In an aspect, contacting of the silica support (e.g., the hydrated silica support, the dried silica support) or the chrominated silica support) with the titanium-containing solution (e.g., ATS) can be effected by any suitable methodology known to one of skill in the art and with the help of this disclosure, such as ion-exchange, incipient wetness, spray drying, pore fill, aqueous impregnation, or the like.

In an aspect, contacting of the silica support (e.g., the hydrated silica support, the dried support), the titanated silica support, and/or the dried titanated silica support with the chromium-containing compound can be effected by any suitable methodology known to one of skill in the art and with the help of this disclosure, such as ion-exchange, incipient wetness, spray drying, pore fill, aqueous impregnation, organic solvent impregnation, melt coating, or the like.

In an aspect, contacting of the silica support (e.g., the hydrated silica support, the dried silica support) with the titanium-containing solution (e.g., ATS) that further comprises a chromium-containing compound can be effected by any suitable methodology known to one of skill in the art and with the help of this disclosure, such as ion-exchange, incipient wetness, spray drying, pore fill, aqueous impregnation, or the like.

In some aspects of the present disclosure, contacting of the components utilized in preparation of the olefin polymerization catalyst may be carried out in the presence of a reaction media. In a further aspect, the reaction media may be formed during contacting of the components utilized in preparation of the olefin polymerization catalyst. The reaction media can comprise a solvent (e.g., water) as disclosed herein and one or more liquids associated with the components utilized in preparation of the olefin polymerization catalyst (e.g., water associated with the silica support). In an aspect, the reaction media excludes any solid component utilized in the preparation of the olefin polymerization catalyst disclosed herein (e.g., silica support and any solids associated therewith). In some aspects, a sum of an amount of water present in the reaction media may be in a range of from about 1 wt. % to about 99 wt. %; alternatively, from about 1 wt. % to about 50 wt. %; alternatively, from about 1 wt. % to about 20 wt. %; or alternatively, from about 1 wt. % to about 10 wt. % based upon the total weight of the reaction media. In yet a further aspect, the reaction media may contain greater than about 20 wt. % water; alternatively, about 40 wt. % water; alternatively, about 60 wt. % water; alternatively, about 80 wt. % water; or alternatively, about 90 wt. % water based upon the total weight of the reaction media wherein the water may originate from one or more components utilized in preparation of the olefin polymerization catalyst.

Drying the support (e.g., the titanated support, the chrominated support (e.g., Cr-silica support), and/or the titanated/chrominated support) can be effected by any means known to one of skill in the art and with the help of this disclosure. For example, drying can comprise heating the support to a temperature in a range of from about 25° C. to about 300° C.; alternatively, from about 50° C. to about 150° C.; or alternatively, from about 75° C. to about 100° C. Drying can further comprise maintaining the temperature in the range of from about 25° C. to about 300° C.; alternatively, from about 50° C. to about 150° C.; or alternatively, from about 75° C. to about 100° C. for a time period of from about 30 minutes to about 6 hours to form a dried support (e.g., which can, in aspects be the pre-catalyst composition). In aspects, for example, drying can be optionally used to remove solvent introduced by the addition of the titanium-containing compound and/or the chromium-containing compound and/or the presence of a reaction media. A dried chrominated, titanated support may be referred to as a pre-catalyst that is suitable for activation (e.g., via calcining) to become a catalyst (e.g., an olefin polymerization catalyst).

In an aspect of the present disclosure, a method for preparation of an olefin polymerization catalyst further comprises activating a pre-catalyst composition prepared as disclosed herein via a calcination step. In some aspects, calcination of the pre-catalyst composition comprises heating the pre-catalyst composition in an oxidizing environment to produce the olefin polymerization catalyst. For example, the pre-catalyst composition may be calcined by heating the pre-catalyst composition in the presence of air to a temperature in a range of from about 400° C. to about 1000° C.; alternatively, from about 500° C. to about 900° C.; or alternatively, from about 500° C. to about 850° C. Calcination of the pre-catalyst composition may further comprise maintaining the temperature of the pre-catalyst composition in the presence of air in the range of from about 400° C. to about 1000° C.; alternatively, from about 500° C. to about 900° C.; or alternatively, from about 500° C. to about 850° C. for a time period in a range of from about 1 minute to about 24 hours; alternatively, from about 1 minute to about 12 hours; alternatively, from about 20 minutes to about 12 hours; alternatively, from about 1 hour to about 10 hours; alternatively, from about 3 hours to about 10 hours; or alternatively, from about 3 hours to about 5 hours to produce the olefin polymerization catalyst.

Also disclosed herein are a titanated silica support, a pre-catalyst composition and a polymerization catalyst produced as described herein. In an aspect, disclosed herein is a pre-catalyst comprising a silica support and (a) titanium in an amount ranging from about 0.01% to about 10% by total weight of the pre-catalyst, wherein the titanium is present within a surface layer on the silica support; (b) an amino acid in an amount ranging from about 0.1 to about 10 mol per mole of Ti present in the pre-catalyst; and (c) optionally, (i) a peroxide, when present, in an amount ranging from about 0.1 to about 10 mol per mole of Ti present in the pre-catalyst; or (ii) a carboxylate, when present, is in an amount ranging from about 0.5 to about 10 mol per mole of Ti present in the pre-catalyst. In an aspect, the amino acid comprises threonine, serine, dimethylglycine, or a combination thereof. In an aspect, the peroxide comprises hydrogen peroxide, dicumyl peroxide, benzoyl peroxide, t-butyl hydroperoxide, di-t-butyl peroxide, a peroxyacid, a per-carboxylic acid, a perester, or a combination thereof. In an aspect, the pre-catalyst further comprises (d) chromium in an amount ranging from about 0.01% to about 10% by total weight of the pre-catalyst. In an aspect, the silica support comprises a surface area of from about 100 m$^2$/gram to about 1000 m$^2$/gram and a pore volume of from about 1.0 cm$^3$/gram to about 2.5 cm$^3$/gram.

Further disclosed herein is a method of producing a polymer, and a polymer produced via the method. The method of producing a polymer comprises contacting a polymerization catalyst as described herein with a monomer under conditions suitable for formation of the polymer; and recovering the polymer. In aspects, the monomer comprises ethylene and the polymer comprises polyethylene.

The olefin polymerization catalysts of the present disclosure are suitable for use in any olefin polymerization method, using various types of polymerization reactors. In an aspect of the present disclosure, a polymer of the present disclosure is produced by any olefin polymerization method, using various types of polymerization reactors. As used herein, "polymerization reactor" includes any reactor capable of polymerizing olefin monomers to produce homopolymers and/or copolymers. Homopolymers and/or copolymers produced in the reactor may be referred to as resin and/or polymers. The various types of reactors include, but are not limited to those that may be referred to as batch, slurry, gas-phase, solution, high pressure, tubular, autoclave, or other reactor and/or reactors. Gas phase reactors may comprise fluidized bed reactors or staged horizontal reactors. Slurry reactors may comprise vertical and/or horizontal loops. High pressure reactors may comprise autoclave and/or tubular reactors. Reactor types may include batch and/or continuous processes. Continuous processes may use intermittent and/or continuous product discharge or transfer. Processes may also include partial or full direct recycle of un-reacted monomer, un-reacted comonomer, olefin polymerization catalyst and/or co-catalysts, diluents, and/or other materials of the polymerization process.

Polymerization reactor systems of the present disclosure may comprise one type of reactor in a system or multiple reactors of the same or different type, operated in any suitable configuration. Production of polymers in multiple reactors may include several stages in at least two separate polymerization reactors interconnected by a transfer system making it possible to transfer the polymers resulting from the first polymerization reactor into the second reactor. Alternatively, polymerization in multiple reactors may include the transfer, either manual or automatic, of polymer from one reactor to subsequent reactor or reactors for additional polymerization. Alternatively, multi-stage or multi-step polymerization may take place in a single reactor, wherein the conditions are changed such that a different polymerization reaction takes place.

The desired polymerization conditions in one of the reactors may be the same as or different from the operating conditions of any other reactors involved in the overall process of producing the polymer of the present disclosure. Multiple reactor systems may include any combination including, but not limited to, multiple loop reactors, multiple gas phase reactors, a combination of loop and gas phase reactors, multiple high pressure reactors, and a combination of high pressure with loop and/or gas reactors. The multiple reactors may be operated in series or in parallel. In an aspect of the present disclosure, any arrangement and/or any combination of reactors may be employed to produce the polymer of the present disclosure.

According to one aspect of the present disclosure, the polymerization reactor system may comprise at least one loop slurry reactor. Such reactors are commonplace, and may comprise vertical or horizontal loops. Generally, continuous processes may comprise the continuous introduction of a monomer, an olefin polymerization catalyst, and/or a diluent into a polymerization reactor and the continuous removal from this reactor of a suspension comprising polymer particles and the diluent. Monomer, diluent, olefin polymerization catalyst, and optionally any comonomer may be continuously fed to a loop slurry reactor, where polymerization occurs. Reactor effluent may be flashed to remove the liquids that comprise the diluent from the solid polymer, monomer and/or comonomer. Various technologies may be used for this separation step, including but not limited to, flashing that may include any combination of heat addition and pressure reduction; separation by cyclonic action in either a cyclone or hydrocyclone; separation by centrifugation; or other appropriate method of separation.

Typical slurry polymerization processes (also known as particle-form processes) are disclosed in U.S. Pat. Nos. 3,248,179, 4,501,885, 5,565,175, 5,575,979, 6,239,235, 6,262,191 and 6,833,415, for example; each of which are herein incorporated by reference in their entirety.

Diluents suitable for use in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is the polymerization of propylene monomer as disclosed in U.S. Pat. No. 5,455,314, which is incorporated by reference herein in its entirety.

According to yet another aspect of the present disclosure, the polymerization reactor may comprise at least one gas phase reactor. Such systems may employ a continuous recycle stream containing one or more monomers continuously cycled through a fluidized bed in the presence of the olefin polymerization catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding an olefin polymerization catalyst-containing polymer formed in a first polymerization zone to a second polymerization zone. One type of gas phase reactor suitable for use is disclosed in U.S. Pat. Nos. 4,588,790, 5,352,749, and 5,436,304, each of which is incorporated by reference in its entirety herein.

According to still another aspect of the present disclosure, a high-pressure polymerization reactor may comprise a tubular reactor or an autoclave reactor. Tubular reactors may have several zones where fresh monomer, initiators, or olefin polymerization catalysts are added. Monomer may be entrained in an inert gaseous stream and introduced at one zone of the reactor. Initiators, olefin polymerization catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another aspect of the present disclosure, the polymerization reactor may comprise a solution polymerization reactor wherein the monomer is contacted with the olefin polymerization catalyst composition by suitable stirring or other means. A carrier comprising an organic diluent or excess monomer may be employed. If desired, the monomer may be brought in the vapor phase and into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for use in the present disclosure may further comprise any combination of at least one raw material feed system, at least one feed system for an olefin polymerization catalyst or catalyst components, and/or at least one polymer recovery system. Suitable reactor systems for the present disclosure may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide polymer properties include, but are not limited to, temperature, pressure, type and quantity of the olefin polymerization catalyst or co-catalyst, and the concentrations of various reactants. Polymerization temperature can affect catalyst productivity, polymer molecular weight and molecular weight distribution. Suitable polymerization temperatures may be any temperature below the de-polymerization temperature, according to the Gibbs Free Energy Equation. Typically, this includes from about 60° C. to about 280° C., for example, and/or from about 70° C. to about 110° C., depending upon the type of polymerization reactor and/or polymerization process.

Suitable pressures will also vary according to the reactor and polymerization process. The pressure for liquid phase polymerization in a loop reactor is typically less than 1000 psig (6.9 MPa). Pressure for gas phase polymerization is usually in a range of from about 200 psig (1.4 MPa)-500 psig (3.45 MPa). High-pressure polymerization in tubular or autoclave reactors is generally run in a range of from about 20,000 psig (138 MPa) to 75,000 psig (518 MPa). Polymerization reactors can also be operated in a supercritical region occurring at generally higher temperatures and pressures. Operation at conditions above the critical point as indicated by a pressure/temperature diagram (supercritical phase) may offer advantages.

The concentration of various reactants can be controlled to produce polymers with certain physical and mechanical properties. The proposed end-use product that will be formed by the polymer and the method of forming that product may be varied to determine the desired final product properties. Mechanical properties include, but are not limited to tensile strength, flexural modulus, impact resistance, creep, stress relaxation and hardness test values. Physical properties include, but are not limited to density, molecular weight, molecular weight distribution, melting temperature, glass transition temperature, temperature melt of crystallization, density, stereoregularity, crack growth, short chain branching, long chain branching and rheological measurements.

The concentrations of monomer, comonomer, hydrogen, co-catalyst, modifiers, and electron donors are generally important in producing specific polymer properties. Comonomer may be used to control product density. Hydrogen may be used to control product molecular weight. Co-catalysts may be used to alkylate, scavenge poisons and/or control molecular weight. The concentration of poisons may be minimized, as poisons may impact the reactions and/or otherwise affect polymer product properties. Modifiers may be used to control product properties and electron donors may affect stereoregularity.

Polymers such as polyethylene homopolymers and copolymers of ethylene with other mono-olefins may be produced in the manner described above using the olefin polymerization catalysts prepared as described herein. Polymers produced as disclosed herein may be formed into articles of manufacture or end use articles using techniques known in the art such as extrusion, blow molding, injection molding, fiber spinning, thermoforming, and casting. For example, a polymer resin may be extruded into a sheet, which is then thermoformed into an end use article such as a container, a cup, a tray, a pallet, a toy, or a component of another product. Examples of other end use articles into which the polymer resins may be formed include pipes, films, and bottles.

A method of the present disclosure comprises contacting an olefin polymerization catalyst of the type described with an olefin monomer under conditions suitable for the formation of a polyolefin and recovering the polyolefin. In an aspect the olefin monomer is an ethylene monomer and the polyolefin is an ethylene polymer (polyethylene).

Polyethylene prepared as described herein may be characterized by a high load melt index (HLMI), in a range of from about 1 g/10 min. to about 1000 g/10 min.; alternatively, from about 3 g/10 min. to about 300 g/10 min.; alternatively, from about 6 g/10 min. to about 100 g/10 min.; or alternatively, from about 15 g/10 min. to about 40 g/10 min.

The melt index (MI) represents the rate of flow of a molten polymer through an orifice of 0.0825 inch diameter when subjected to a force of 2,160 grams at 190° C. as determined in accordance with ASTM D1238-82 condition E. The I10 represents the rate of flow of a molten polymer through an orifice of 0.0825 inch diameter when subjected to a force of 10,000 grams at 190° C. as determined in accordance with ASTM D1238-82 condition N. The HLMI (high load melt index) represents the rate of flow of a molten polymer through an orifice of 0.0825 inch diameter when subjected to a force of 21,600 grams at 190° C. as determined in accordance with ASTM D1238-82 condition F.

Utilization of a titanium-containing solution (e.g., ATS) in the preparation of an olefin polymerization catalyst of the present disclosure may be advantageous because the ATS can facilitate the association of titanium with a silica support in the presence of an aqueous solvent (e.g., water). Further advantages may occur when the titanium-containing solution utilized to form the olefin polymerization catalyst comprises an aqueous solvent (e.g., water). The solubility of titanium in the aqueous solvent may be sufficient to allow the use of spray drying methodologies for contacting the ATS and a silica support. Spray drying as used herein refers to a method of producing a dry powder from a liquid or slurry by rapidly drying with a hot gas. Spray drying methodologies may be utilized in the preparation of olefin polymerization catalysts in a continuous production method with the potential to produce large volumes of olefin polymerization catalysts. Spray drying methodologies may also be utilized in the preparation of olefin polymerization catalysts having a consistent particle size distribution.

Utilization of the titanium-containing solution comprising the aqueous solvent (i.e., ATS) may permit use of a hydrated silica support and obviate the thermal treatment required for anhydrous methods of catalyst preparation, (e.g., drying a hydrated silica support prior to contact with any other catalyst component).

The herein disclosed utilization of amino acid and optionally a peroxide or a carboxylate, as described herein, that are soluble in water but resist hydrolysis, enables binding of the titanium to a support during the production of a chromium-silica-titanium (Cr/Si—Ti) catalyst. Aqueous solutions of amino acid and optionally a peroxide or a carboxylate, as described herein, which are inexpensive, can be utilized in the aqueous titanation of polymerization catalysts.

Highly reactive volatile organic compounds (HRVOC) may be emitted during catalyst production. HRVOCs play a role in the formation of ozone in ozone nonattainment areas, i.e., areas that do not meet the Environmental Protection Agency's air quality standards for ground-level ozone. Consequently, processes that create HRVOC emissions may be subject to compliance with various state and federal regulations regarding HRVOC emission, such as the HRVOC emissions cap and trade program. Utilization of an aqueous titanium solution (ATS) to produce a pre-catalyst composition and a polymerization catalyst as described herein can results in the production of a reduced amount of HRVOCs during catalyst production, e.g., due to the use of the aqueous solution, rather than an organic solvent. The herein disclosed method provides an inexpensive, effective and efficient way of producing an olefin polymerization catalyst.

EXAMPLES

The following examples are given as particular aspects of the present disclosure and to demonstrate the practice and advantages thereof. It is understood that the examples are given by way of illustration and are not intended to limit the specification or the claims to follow in any manner.

In each experiment of the following examples HA30W, a Cr/silica catalyst made by W. R Grace, was titanated as described below then activated by calcination in dry air at 650° C. for three hours. The final catalysts contained 3.5 wt % titanium.

Activity tests were conducted in a 2.2 liter steel reactor equipped with a marine stirrer running at 500 rpm. The reactor was surrounded by a steel jacket circulating water, the temperature of which was controlled by use of steam and water heat exchangers. These were connected in an electronic feed-back loop so that the reactor temperature could be maintained at +/−0.5° C. during the reaction.

Unless otherwise stated, a small amount (0.01 to 0.10 grams normally) of the solid chromium catalyst was first charged under nitrogen to the dry reactor. Next about 0.25 g of sulfate-treated alumina (600° C.) was added as a scavenger for poisons. Then 1.2 liter of isobutane liquid was charged and the reactor heated up to the specified temperature, usually 105° C. Finally, ethylene was added to the reactor to equal a fixed pressure, normally 550 psig (3.8 MPa), which was maintained during the experiment. The stirring was allowed to continue for the specified time, usually around one hour, and the activity was noted by recording the flow of ethylene into the reactor to maintain the set pressure.

After the allotted time, the ethylene flow was stopped and the reactor slowly depressurized and opened to recover a granular polymer powder. In all cases the reactor was clean with no indication of any wall scale, coating or other forms of fouling. The polymer powder was then removed and weighed. Activity was specified as grams of polymer produced per gram of solid catalyst charged per hour.

Control Example 1

For control experiments C1, C2, and C3: each mole of titanium isopropoxide was dissolved in the indicated number of moles ("Mol/Ti" in Table 1) of oxalic acid in aqueous solution. This solution was then impregnated into HA30W catalyst, which was then dried and calcined at 650° C. in air for three hours. The amount of titanium was 3.5 wt % loading on the catalyst. A first control C1 comprised no oxalic acid; a second control C2 comprises 2 moles of oxalic acid per mole of titanium isopropoxide; and a third control C3 comprised 3 moles of oxalic acid per mole of titanium isopropoxide.

For inventive experiments I1, I2, I3, and I4, the same amount of titanium (3.5 wt % loading) was dissolved using the indicated number of moles of amino acid ("Mol/Ti" in Table 1). This solution was then impregnated into the HA30W catalyst which was then dried and calcined at 650° C. in air for three hours. In inventive experiments I1 and I2, the aqueous solution comprised 4.5 moles of the amino acid N,N-dimethylglycine per mole of titanium isopropoxide; in inventive experiment I3 the aqueous solution comprised 2 moles of the amino acid threonine per mole of titanium isopropoxide; and in inventive experiment I4 the aqueous solution comprised 3 moles of the amino acid threonine per mole of titanium isopropoxide. In inventive experiments I2 and I3, the aqueous solution further comprised 5 moles of hydrogen peroxide per mole of titanium. In inventive examples I5 to I8, the aqueous solution comprised 2 moles of oxalic acid per mole of titanium in combination with 2 moles of glycine per mole of titanium (I5), 2 moles of N,N-dimethylglycine per mole of titanium (I6), and 1.85 moles of arginine per mole of titanium (I7 and I8).

Table 1 shows the components utilized in the control and inventive experiments, and also provides the yield (grams polyethylene per gram catalyst), the activity (grams polyethylene per gram catalyst per hour), the high load melt index (HLMI in decigrams per minute, as measured by ASTM D1238, condition 190/21.6, at 190° C. with a 21.6 kg weight), the I10 (decigrams per minute, as measured by the same technique with a 10 kg weight), the melt index (MI in decigrams per minute, as measured by ASTM D1238, condition 190/2.16, at 190° C. with a 2.16 kg weight), and the shear (ratio of the HLMI to the MI).

ing to be limited by theory, it is believed that the presence of an amino acid of the type described herein helps to prevent undesired "clumping" or agglomeration of the titanium on the silica support during the drying and/or calcination steps. The clumped or agglomerated forms of titanium on the silica support do not provide a desired catalytic function in contrast to a dispersed form of titanium on the silica support that does provide a desired catalytic function and resultant polymer characteristics (e.g., increased melt index). Without intending to be limited by theory, it is believed that the amino acid may function to prevent degradation (e.g., hydrolysis) of one or more intermediate titanium compounds (e.g., titanium oxalate) formed during the catalyst preparation methodology (e.g., formation of the ATS, impregnation of the silica support with the ATS, drying the impregnated support, and/or calcining the dried impregnated support to yield a Cr/Si—Ti catalyst).

ADDITIONAL DISCLOSURE

The following enumerated aspects of the present disclosure are provided as non-limiting examples.

A first aspect which is a method of a method comprising contacting a silica support with a titanium-containing solution to form a titanated silica support, wherein the titanium-containing solution comprises a titanium compound, a solvent, and an amino acid.

TABLE 1

| Run | Dissolved in: | Mol/Ti | Induction Time (min) | Yield (g/g) | Activity (g/g-h) | HLMI (dg/min) | I10 (dg/min) | MI (dg/min) | Shear (HLMI/MI) |
|---|---|---|---|---|---|---|---|---|---|
| Control Runs: | | | | | | | | | |
| C1 | Oxalic Acid | 0 | 11 | 2973 | 2973 | 5.45 | 0.87 | 0.0000 | — |
| C2 | Oxalic Acid | 2 | 14 | 2877 | 2813 | 6.86 | 1.11 | 0.0000 | — |
| C3 | Oxalic Acid | 3 | 13 | 2933 | 3088 | 6.43 | 1.03 | 0.0000 | — |
| Inventive Runs: | | | | | | | | | |
| I1 | Dimethyl glycine | 4.5 | — | 2749 | 2170 | 7.02 | 1.27 | 0.018 | 397 |
| I2 | Dimethyl glycine | 4.5 | 16 | 3060 | 3165 | 5.91 | 1.03 | 0.013 | 469 |
| I3 | Threonine + H$_2$O$_2$ | 2 | 10 | 3019 | 3483 | 9.48 | 1.71 | 0.03 | 379 |
| I4 | Threonine + H$_2$O$_2$ | 3 | 10 | 3119 | 5347 | 12.7 | 2.27 | 0.04 | 301 |
| I5 | Oxalic Acid + Glycine | 2 (oxalic) 2 (glycine) | 15 | 3150 | 3098 | 13.6 | 2.67 | 0.092 | 148 |
| I6 | Oxalic Acid + Dimethyl glycine | 2 (oxalic) 2 (dimethyl glycine) | 10 | 3297 | 3243 | 21.5 | 4.18 | 0.176 | 122 |
| I7 | Oxalic Acid + Arginine | 2 (oxalic) 1.85 (arginine) | 17 | 3244 | 3089 | 14.4 | 2.64 | 0.078 | 185 |
| I8 | Oxalic Acid + Arginine | 2 (oxalic) 1.85 (arginine) | 13 | 3142 | 2945 | 12.8 | 2.35 | 0.058 | 222 |

The experimental results show that an aqueous titanium solution (ATS) comprising an amino acid, as described herein, can be utilized to successfully titanate a polymerization catalyst.

The experimental results show that an aqueous titanium solution (ATS) as described herein can be utilized to successfully titanate a polymerization catalyst. Without intend- A second aspect which is the method of the first aspect, further comprising drying the titanated support by heating the titanated support to a temperature in a range of from about 50° C. to about 200° C. and maintaining the temperature of the titanated support in the range of from about 50° C. to about 200° C. for a time period of from about 30 minutes to about 6 hours to form a pre-catalyst.

A third aspect which is the method of the second aspect, further comprising contacting a chromium-containing compound with the silica support, the titanated silica support, the pre-catalyst, or combinations thereof.

A fourth aspect which is the method of the first aspect, wherein the silica support comprises chromium.

A fifth aspect which is the method of the first aspect, wherein the silica support is simultaneously contacted with the titanium-containing solution and a chromium-containing compound.

A sixth aspect which is the method of the fifth aspect, wherein the titanium-containing solution comprises the chromium-containing compound.

A seventh aspect which is the method of any of the third to the sixth aspects, wherein the chromium-containing compound comprises chromium trioxide, chromium acetate, chromium nitrate, chromium sulfate, tertiary butyl chromate, biscyclopentadienyl chromium(II), chromium(III) acetylacetonate, or combinations thereof.

An eighth aspect which is the method of any of the first to the seventh aspects, wherein the solvent is selected from the group consisting of water, alcohol, and combinations thereof.

A ninth aspect which is the method of any of the first to the eighth aspects, wherein the solvent is an aqueous solvent.

A tenth aspect which is the method of any of the first to the ninth aspects, wherein the titanium compound comprises a titanium (IV) compound, a titanium (III) compound, titania, or combinations thereof.

An eleventh aspect which is the method of any of the first to the tenth aspects, wherein the titanium compound comprises a titanium(IV) compound comprising an alkoxide group.

A twelfth aspect which is the method of the eleventh aspect, wherein the titanium compound has the formula $Ti(OR)_4$, $TiO(OR)_2$, $Ti(OR)_2(acac)_2$, or $Ti(OR)_2(oxal)$, wherein "acac" is acetylacetonate, "oxal" is oxalate, and each R independently is ethyl, isopropyl, n-propyl, isobutyl, or n-butyl.

A thirteenth aspect which is the method of the tenth aspect, wherein the titanium (IV) compound comprises $Ti(OH)_4$, $TiO(OH)_2$, $TiO_2$, $TiO(oxalate)_2$, or a combination thereof, and wherein the titanium (III) compound comprises $Ti_2(SO_4)_3$, $Ti(OAc)_3$, $Ti(oxalate)_3$, $Ti(NO_3)_3$, or a combination thereof.

A fourteenth aspect which is the method of any of the first to the thirteenth aspects, wherein the amino acid comprises an alpha (α) amino acid, a beta (β) amino acid, or a combination thereof, wherein an α amino acid is an amino acid having an amino group and a carboxyl group attached to the alpha carbon, and wherein a β amino acid is an amino acid in which the amino group is attached to the secondary carbon.

A fifteenth aspect which is the method of any of the first to the fourteenth aspects, wherein the amino acid comprises threonine, serine, dimethylglycine, or a combination thereof.

A sixteenth aspect which is the method of any of the first to the fifteenth aspects, wherein the titanium-containing solution further comprises a peroxide.

A seventeenth aspect which is the method of the sixteenth aspect, wherein the peroxide comprises hydrogen peroxide, dicumyl peroxide, benzoyl peroxide, t-butyl hydroperoxide, di-t-butyl peroxide, a peroxyacid, a per-carboxylic acid, a perester, or a combination thereof.

An eighteenth aspect which is the method of any of the first to the seventeenth aspects, wherein the titanium-containing solution further comprises a carboxylate.

A nineteenth aspect which is the method of the eighteenth aspect, wherein the carboxylate comprises a multi carboxylate, an alpha-hydroxy carboxylate, or a combination thereof.

A twentieth aspect which is the method of the eighteenth aspect, wherein the carboxylate is provided by a carboxylic acid selected from the group consisting of acetic acid, formic acid, citric acid, gluconic acid, glycolic acid, glyoxylic acid, lactic acid, malic acid, malonic acid, oxalic acid, propionic acid, phosphonoacetic acid, tartaric acid, and combinations thereof.

A twenty-first aspect which is the method of any of the first to the twentieth aspects, wherein the silica support has a surface area of from about 100 $m^2$/gram to about 1000 $m^2$/gram and a pore volume of from about 1.0 $cm^3$/gram to about 2.5 $cm^3$/gram.

A twenty-second aspect which is the method of the third aspect, further comprising calcining the pre-catalyst by heating the pre-catalyst in a reducing atmosphere to a temperature in a range of from about 400° C. to about 1000° C. and maintaining the temperature of the pre-catalyst in the range of from about 400° C. to about 1000° C. for a time period of from about 1 minute to about 24 hours to form a catalyst.

A twenty-third aspect which is a method comprising contacting a chrominated silica support with a aqueous titanium solution to form a titanated/chrominated silica support, wherein the aqueous titanium solution comprises water, a titanium compound, and an amino acid, drying the titanated/chrominated silica support by heating the titanated/chrominated silica support to a temperature in a range of from about 50° C. to about 200° C. and maintaining the temperature of the titanated/chrominated silica support in the range of from about 50° C. to about 200° C. for a time period of from about 1 second to about 6 hours, alternatively from about 30 minutes to about 6 hours, to form a pre-catalyst, and calcining the pre-catalyst by heating the pre-catalyst in an oxidizing atmosphere (e.g., in the presence of oxygen such as air) to a temperature in a range of from about 400° C. to about 1000° C. and maintaining the temperature of the pre-catalyst in the range of from about 400° C. to about 1000° C. for a time period of from about 1 minute to about 24 hours to form a catalyst.

A twenty-fourth aspect which is the method of the twenty-third aspect, wherein the aqueous titanium is prepared by (i) preparing a first solution by combining the amino acid and water; (ii) adding the titanium compound (e.g., a titanium alkoxide such as titanium isopropoxide) to the first solution to form a second solution; and (iii) optionally adding a peroxide (e.g., hydrogen peroxide) to the first or second solutions.

A twenty-fifth aspect which is the method of the twenty-fourth aspect, further comprising contacting a chromium-containing compound with a silica support to form the chrominated silica support, wherein the chromium-containing compound comprises chromium trioxide, chromium acetate, chromium nitrate, chromium sulfate, tertiary butyl chromate, biscyclopentadienyl chromium(II), chromium(III) acetylacetonate, or combinations thereof.

A twenty-sixth aspect which is a titanated silica support prepared by the method of the first aspect.

A twenty-seventh aspect which is a pre-catalyst prepared by the method of the third aspect.

A twenty-eighth aspect which is a catalyst produced by the method of the twenty-second aspect.

A twenty-ninth aspect which is the pre-catalyst of the twenty-seventh aspect, wherein an amount of titanium present in the pre-catalyst ranges from about 0.01% to about 10% by total weight of the pre-catalyst and an amount of chromium present in the pre-catalyst ranges from about 0.01% to about 10% by total weight of the pre-catalyst.

A thirtieth aspect which is the catalyst of the twenty-eighth aspect, wherein an amount of titanium present in the catalyst ranges from about 0.01% to about 10% by total weight of the catalyst and an amount of chromium present in the catalyst ranges from about 0.01% to about 10% by total weight of the catalyst.

A thirty-first aspect which is a pre-catalyst comprising a silica support and (a) titanium in an amount ranging from about 0.01% to about 10% by total weight of the pre-catalyst, wherein the titanium is present within a surface layer on the silica support, (b) an amino acid in an amount ranging from about 0.1 to about 10 mol per mole of Ti present in the pre-catalyst; and (c) optionally, (i) a peroxide, when present, in an amount ranging from about 0.1 to about 10 mol per mole of Ti present in the pre-catalyst, or (ii) a carboxylate, when present, is in an amount ranging from about 0.5 to about 10 mol per mole of Ti present in the pre-catalyst.

A thirty-second aspect which is the pre-catalyst of the thirty-first aspect, wherein the amino acid comprises threonine, serine, dimethylglycine, or a combination thereof.

A thirty-third aspect which is the pre-catalyst of the thirty-first or the thirty-second aspect, wherein the peroxide comprises hydrogen peroxide, dicumyl peroxide, benzoyl peroxide, t-butyl hydroperoxide, di-t-butyl peroxide, a peroxyacid, a per-carboxylic acid, a perester, or a combination thereof.

A thirty-fourth aspect which is the pre-catalyst of any of the thirty-first to the thirty-third aspects, further comprising (d) chromium in an amount ranging from about 0.01% to about 10% by total weight of the pre-catalyst.

A thirty-fifth aspect which is the pre-catalyst of any of the thirty-first to the thirty-fourth aspects, wherein the silica support comprises a surface area of from about 100 $m^2$/gram to about 1000 $m^2$/gram and a pore volume of from about 1.0 $cm^3$/gram to about 2.5 $cm^3$/gram.

A thirty-sixth aspect which is a method of producing polyethylene, comprising contacting the catalyst of the twenty-fifth aspect with ethylene under conditions suitable for formation of polyethylene; and recovering the polyethylene.

The terms "a", "an", and "the" are intended, unless specifically indicated otherwise, to include plural alternatives, e.g., at least one. Herein, while methods and processes are described in terms of "comprising" various components or steps, the methods and processes can also "consist essentially of" or "consist of" the various components or steps. A particular feature of the disclosed subject matter can be disclosed as follows: Feature X can be A, B, or C. It is also contemplated that for each feature the statement can also be phrased as a listing of alternatives such that the statement "Feature X is A, alternatively B, or alternatively C" is also an aspect of the present disclosure whether or not the statement is explicitly recited.

While various aspects of the present disclosure have been shown and described, modifications thereof can be made by one skilled in the art without departing from the spirit and teachings of the present disclosure. The aspects of the present disclosure described herein are exemplary only and are not intended to be limiting. Many variations and modifications of the present disclosure are possible and are within the scope of the present disclosure. Where numerical ranges or limitations are expressly stated, such express ranges or limitations should be understood to include iterative ranges or limitations of like magnitude falling within the expressly stated ranges or limitations (e.g., "from about 1 to about 10" includes, 2, 3, 4, etc.; "greater than 0.10" includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as "comprises", "includes", "having", etc. should be understood to provide support for narrower terms such as "consisting of", "consisting essentially of", "comprised substantially of", etc.

Accordingly, the scope of protection is not limited by the description set out above but is only limited by the claims which follow, that scope including all equivalents of the subject matter of the claims. Each and every claim is incorporated into the specification as an aspect of the present disclosure. Thus, the claims are a further description and are an addition to the aspect of the present disclosure. The discussion of a reference in the present disclosure is not an admission that it is prior art to the present disclosure, especially any reference that may have a publication date after the priority date of this application. The present disclosures of all patents, patent applications, and publications cited herein are hereby incorporated by reference, to the extent that they provide exemplary, procedural or other details supplementary to those set forth herein.

All publications, patent applications, and patents mentioned herein are incorporated by reference in their entirety. In the event of conflict, the present specification, including definitions, is intended to control. With respect to all ranges disclosed herein, such ranges are intended to include any combination of the mentioned upper and lower limits even if the particular combination is not specifically listed.

What is claimed is:

1. A method for making an olefin polymerization catalyst comprising
    (a) contacting a silica support with a titanium-containing solution to form a titanated silica support;
    (b) drying the titanated silica support by heating the titanated silica support to a temperature in a range of from about 50° C. to about 200° C. and maintaining the temperature of the titanated silica support in the range of from about 50° C. to about 200° C. for a time period of from about 30 minutes to about 6 hours to form a pre-catalyst composition; and
    (c) calcining the pre-catalyst composition to a temperature in a range of from 400° C. to about 1000° C. and maintaining the temperature of the pre-catalyst composition in a presence of air in the range of from 400° C. to about 1000° C. for a time period of from about 1 minute to about 24 hours to produce the olefin polymerization catalyst having titanium present in an amount from about 0.01 wt % to about 10 wt % based upon a total weight of the olefin polymerization catalyst;
    wherein the titanium-containing solution comprises a titanium compound, a solvent, an amino acid, and a carboxylate;
    wherein the titanium compound comprises a titanium (IV) compound;
    wherein the silica support has an average particle size of from about 10 microns to about 500 microns;
    wherein the amino acid comprises a threonine a serine, or combination thereof;

wherein the titanium-containing solution has a pH of from about 2.5 to about 5.5; and wherein the titanium-containing solution comprises a molar ratio of amino acid to the titanium compound in a range of 0.1 to 10.

2. The method of claim 1, further comprising contacting a chromium-containing compound with the silica support, the titanated silica support, the pre-catalyst composition, or combinations thereof.

3. The method of claim 1, wherein the silica support comprises a chromium.

4. The method of claim 1, wherein the silica support is simultaneously contacted with the titanium-containing solution and a chromium-containing compound.

5. The method of claim 4, wherein the titanium-containing solution further comprises the chromium-containing compound.

6. The method of claim 2, wherein the chromium-containing compound comprises chromium trioxide, chromium acetate, chromium nitrate, chromium sulfate, tertiary butyl chromate, biscyclopentadienyl chromium (II), chromium (III) acetylacetonate, or combinations thereof.

7. The method of claim 1, wherein the solvent is selected from the group consisting of water, alcohol, and combinations thereof.

8. The method of claim 1, wherein the solvent is an aqueous solvent.

9. The method of claim 1, wherein the titanium(IV) compound comprising an alkoxide group.

10. The method of claim 1, wherein the titanium (IV) compound comprises $Ti(OH)_4$, $TiO(OH)_2$, $TiO_2$, $TiO(oxalate)_2$, or a combination thereof.

11. The method of claim 1, wherein the titanium-containing solution further comprises a peroxide.

12. The method of claim 11, wherein the peroxide comprises hydrogen peroxide, dicumyl peroxide, benzoyl peroxide, t-butyl hydroperoxide, di-t-butyl peroxide, a peroxyacid, a per-carboxylic acid, a perester, or a combination thereof.

13. The method of claim 1, wherein the carboxylate comprises a multi carboxylate, an alpha-hydroxy carboxylate, or a combination thereof.

14. The method of claim 1, wherein the carboxylate is provided by a carboxylic acid selected from the group consisting of acetic acid, formic acid, citric acid, gluconic acid, glycolic acid, glyoxylic acid, lactic acid, malic acid, malonic acid, oxalic acid, propionic acid, phosphonoacetic acid, tartaric acid, and combinations thereof.

15. The method of claim 1 wherein the silica support comprises from about 1 wt.% to about 20 wt.% water based on a total weight of the silica support.

16. The method of claim 2, wherein the titanium (IV) compound comprises $Ti(OH)_4$, $TiO(OH)_2$, $TiO_2$, $TiO(oxalate)_2$, or a combination thereof.

17. The method of claim 2, wherein the chromium is present in a range of from about 0.01 wt.% to about 10 wt.% based on a total weight of the polymerization catalyst.

* * * * *